June 21, 1966 N. E. WHITNEY 3,256,593
APPARATUS FOR ASSEMBLING FINS ON A TUBE
Filed April 11, 1962 3 Sheets-Sheet 1
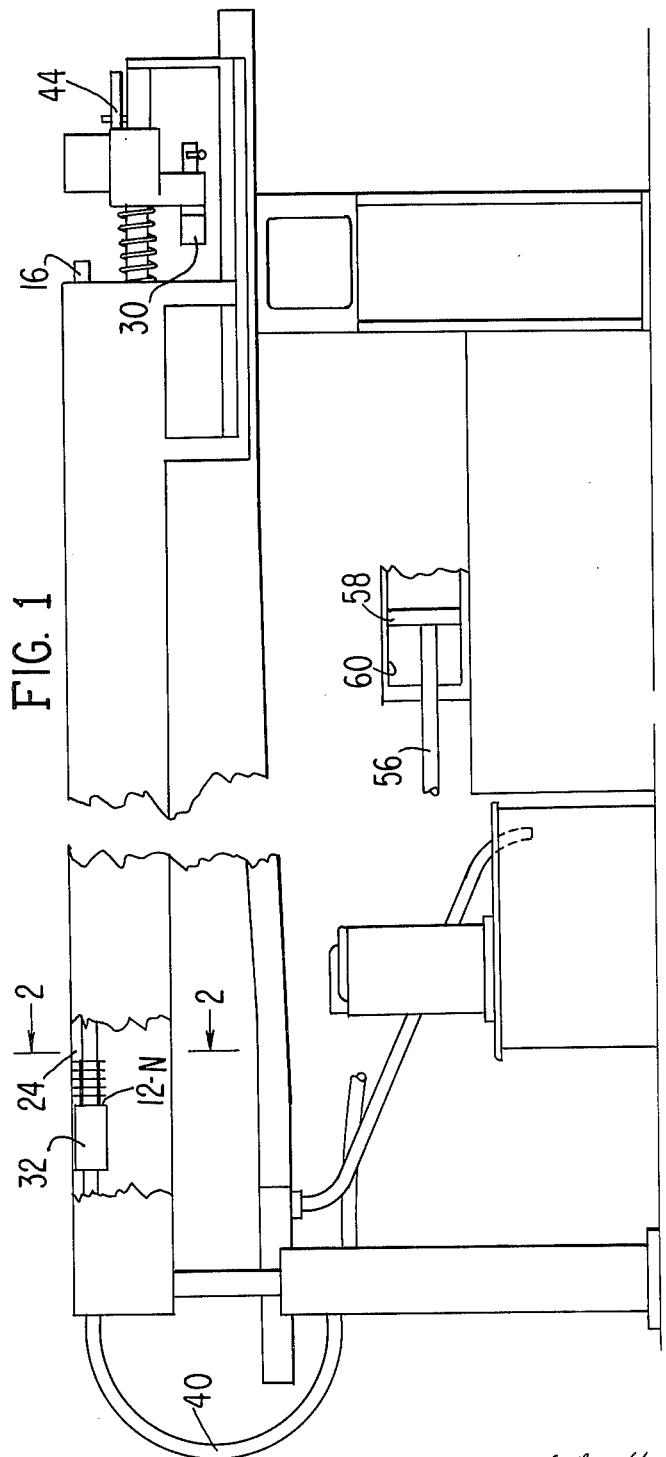
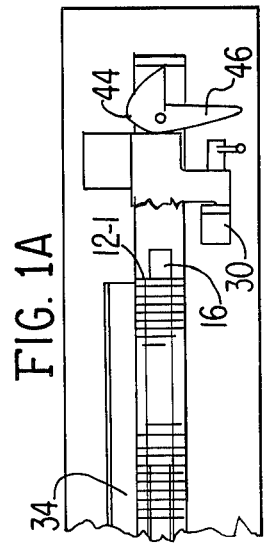
INVENTOR.
Nicholas E. Whitney
BY
Wolfe, Hubbard, Voit & Osann.
Attys.

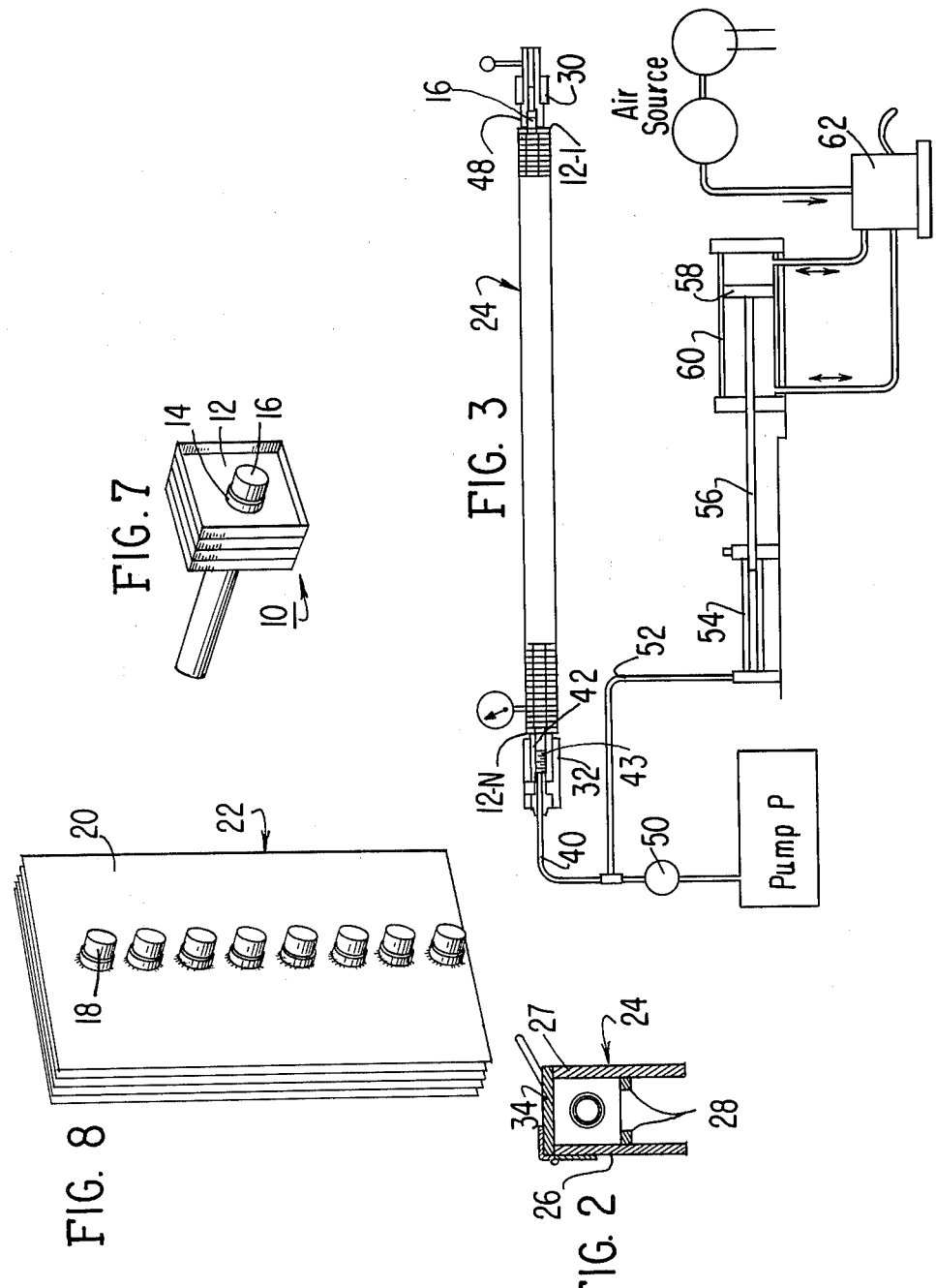

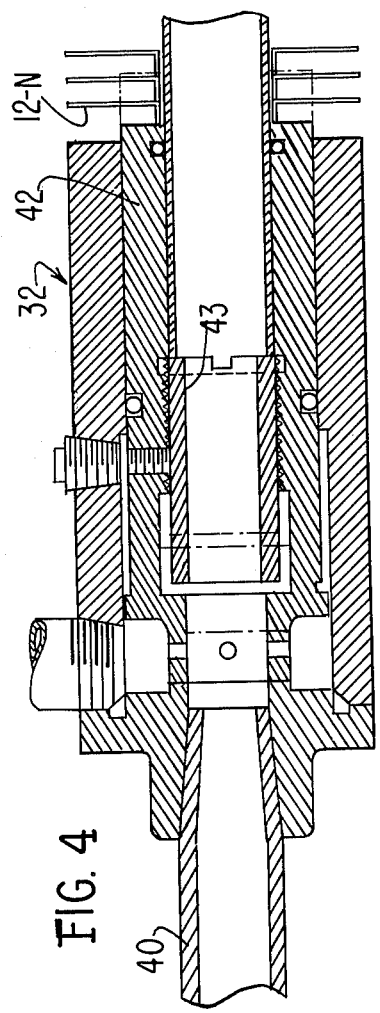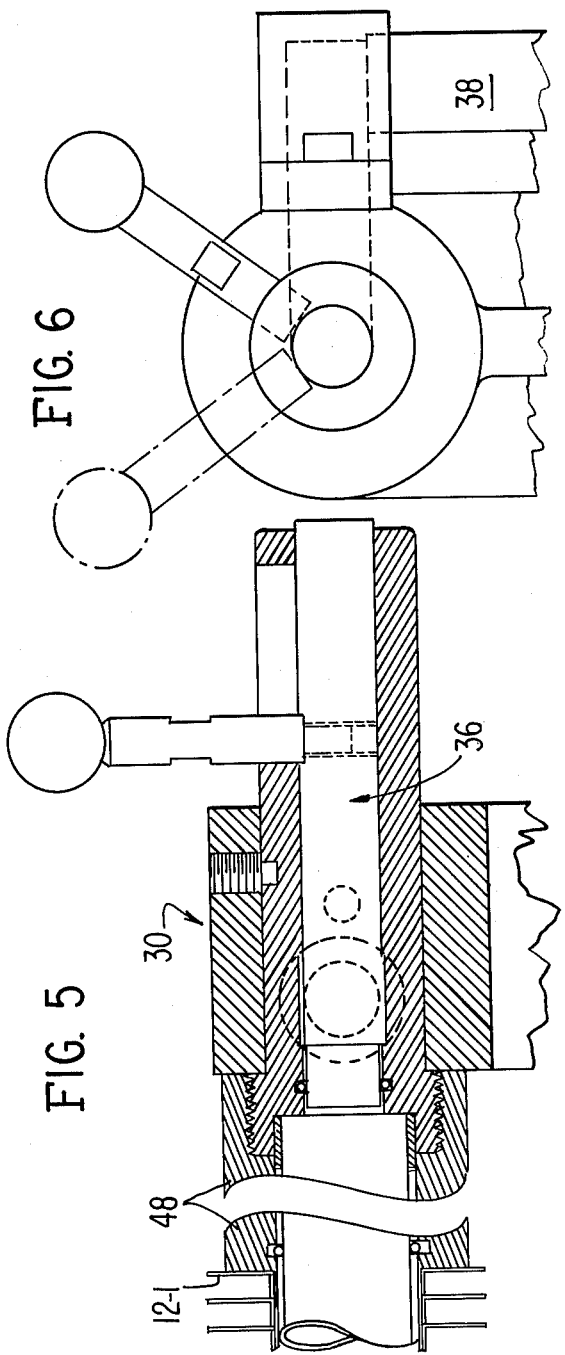

United States Patent Office 3,256,593
Patented June 21, 1966

3,256,593
APPARATUS FOR ASSEMBLING FINS ON A TUBE
Nicholas E. Whitney, Michigan City, Ind., assignor to Weil-McLain Company, Inc., Michigan City, Ind., a corporation of Indiana
Filed Apr. 11, 1962, Ser. No. 187,164
5 Claims. (Cl. 29—202)

This invention relates to the manufacture of an element having fins supported by a tube, such as a heat radiating element for heating or cooling units, and more particularly to a method by which the fins of the element are fixed to a tube by expanding the tube hydraulically.

In the manufacture of such elements, it has hitherto been necessary, in order to fix the fins to a tube without fusing the joint by welding, brazing or the like, to insert mechanical means such as a tapered plug inside the tube, drawing the plug longitudinally thereby expanding the tube.

One disadvantage of this mechanical method of obtaining an unfused tube to fin bond lies in the difficulty in producing complete circumferential contact for good heat flow between each fin of an assembly and the tube, due to the variations from nominal dimensions in the sizes of the fins and the tube which may not be accommodated by the fixed expansion produced by the mechanical means. Moreover, where mechanical means are used to expand the tube by contact with the inside wall, any substantial variations in wall thickness and inside to outside wall concentricity will result in the outside wall of the tube being forced to an oval or other non-circular configuration providing a poor fit in the surrounding fins.

Another disadvantage of the mechanical method lies in the possibility of galling, scoring or weakening the tube due to contact with the inside wall by the mechanical means.

A further disadvantage lies in the difficulty in handling the assembly and manipulating the mechanical expansion means so as to provide the desired tube expansion without bending or collapsing the tube.

This invention has for its object to variably expand the tube hydraulically throughout the fin stack length, limiting the outward expansion of the tube by means of the fins, so as to obtain the desired intimate, completely circumferential, tube to fin bonding which will produce a good heat flow path.

In accordance with the present invention, apparatus for carrying forward this method is provided which apparatus is adapted to receive an assembly of fins loosely stacked on a tube to form a heat radiating element. The apparatus provides for hydraulically sealing both ends of the tube, for conveying fluid under low pressure to the tube, and for raising the pressure of fluid within the tube to relatively high pressure thereby hydraulically expanding the tube. The apparatus, in keeping with the present invention, further provides for limiting the expansion of the tube at both ends terminally of the stack of fins thereby to avoid excessive tube enlargement in these regions due to the pressure of the fluid while permitting longitudinal tube movement within the stack of fins, caused by shortening of the tube as the latter expands.

Referring to the accompanying drawings:

FIGURE 1 is a side elevational view of hydraulic tube expanding apparatus constructed according to the invention;

FIG. 1A is a fragmentary plan view of the apparatus shown in FIGURE 1;

FIG. 2 is a fragmentary sectional view taken in the plane of lines 2—2 of FIGURE 1;

FIG. 3 is a diagrammatic view of a hydraulic circuit for the apparatus of FIGURE 1;

FIG. 4 is an enlarged longitudinal sectional view of the tube sealing fixture located adjacent the left-hand end of the apparatus as viewed in FIGURE 1;

FIG. 5 is an enlarged longitudinal sectional view of the tube sealing fixture adjacent the right-hand end of the apparatus as viewed in FIGURE 1;

FIG. 6 is an end elevational view of the fixture shown in FIG. 5;

FIG. 7 is a fragmentary perspective view of a heat radiating element; and

FIG. 8 is a fragmentary perspective view of another form of heat radiating element.

In the constructional example according to the figures of the drawings, an apparatus, as shown in FIGURE 1, is provided for the manufacture of a finned element such as a heat radiating element 10 of which a fragmentary portion is shown in FIG. 7, comprising adjacent fins 12 of copper, aluminum, or steel, each having a collar 14 fitting around a tube 16. The inside diameter of the collar 14 is slightly larger than the outside diameter of the tube 16, having, for example, .012" clearance where the tube has a nominal outside diameter of 1", such that as a first assembly step a stack of such fins 12 is placed on the tube 16, the fins being slidable thereon. The apparatus of FIGURE 1 provides for expanding the tube 16 hydraulically into contact with the collars 14 of the fins 12 to obtain tube to fin bonding. Referring to FIG. 8, it is contemplated that the method may be employed for fixing each of a plurality of tubes 18 to a common stack of fins 20, to manufacture an element 22, such as shown in this figure. The method of the present invention is not limited to the manufacture of either element shown in FIGS. 7 or 8, but may be employed in the manufacture of other fin and tube elements. The invention provides apparatus particularly well suited for carrying out the above-described tube to fin bonding method, although it will be evident that it is not limited to such use.

In carrying out this invention, the assembly of fins 12 and tube 16, to form a heat radiating element of the type shown in FIG. 7, is laid lengthwise of the apparatus as shown in FIGURE 1 in a trough 24 having side walls 26, 27 spaced silghtly greater than the width of the fins 12, and longitudinal member 28 on which the fins rest throughout the length of the assembly, with the tube 16 being received at both ends in sealing fixtures 30, 32 mounted on the apparatus. A hinged cover 34 adapted to be lowered into position resting on the side walls 26, 27 of the trough 24, confines the tube and fin assembly against upward movement during tube expansion. One tube sealing fixture 30, mounted at the right end of the machine, as viewed in FIGURE 1, also provides for venting air from the inside of the tube 16 as fluid is admitted. Referring to FIG. 5, for this purpose a sliding bolt-like valve 36 is provided for selectively connecting the tube 16 to a drain pipe 38 (FIG. 6). The fixture 32 for the opposite end of the tube 16 is movable in position on the machine to adjust to assemblies of different length. As shown in FIGURE 1, the left-hand sealing fixture 32 is located adjacent the end of the trough 24 thereby to receive a longer length tube, for example, a tube 6" in length. This sealing fixture 32 may be adjusted to other positions to receive shorter length tubes, for example, tubes of 2' or 4' in length. The left-hand fixture 32 provides means for conveying fluid under pressure from a conduit 40 to the tube 16 and also includes a telescoping plunger 42 (FIG. 4) having an adjustable stop 43 against which the end of the tube 16 is firmly abutted when the tube and fin assembly is placed in the machine. The tube 16 is forced against the plunger stop 43 by means of the venting fixture 30 which is mounted to be pivoted about a supporting shaft 45 between an out-of-the-way position and an operative position (as shown in FIG. 3) aligned with the tube of the assembly. The venting fixture 30 includes a cam 44 operated by a handle 46 for moving the fixture against a spring 47 so as to force the barrel 48 of the fixture axially over the end of the assembly tube 16 and thereby seating the other end of the tube against the plunger stop 43 of the associated fixture 32. It will be noted that the plunger stop 43 is adjustable axially to accommodate small variations in tube length.

With the tube and fin assembly mounted in the trough 24, and the tube 16 received in the sealing fixtures 30, 32, the fins 12 of the assembly are confined between the fixtures at the opposite ends thereof. The end of the barrel 48 of the venting fixture is in direct contact with the adjacent fin 12–1, and the end of the telescoping plunger 42 is in similar contact with the adjacent fin 12–N, thereby encasing the terminal portions of the tube 16. The remainder of the tube 16, throughout the length of the assembly of fins, is encased by the collars 14 of the fins, which are abutted one with the other.

The apparatus may be operated automatically, eliminating handling of the tube during the expansion process which is followed to produce tube to fin bonding. A suitable hydraulic circuit for the apparatus is shown in FIG. 3. Fluid is conveyed to the tube 16 of the assembly in the trough 24 of the apparatus via the telescoping fixture 32 and the connecting conduit 40 by opening a pilot valve 50 and operating the pump P to fill the tube 16 with fluid under low pressure. Fluid is also fed through the conduit 52 to a cylinder 54 receiving the piston rod 56 of a piston 58 in a double acting cylinder 60. During the tube filling stage, the venting fixture 30 is left open by means of a valve 36 until fluid flowing out the drain pipe 38 is seen to be free of air bubbles, and the valve 36 is then closed to seal the end of the tube. The pilot valve 50 is closed, and the foot valve 62 operated to admit air under pressure from a suitable source to the double acting cylinder 60 behind the piston 58 movable therein. The piston rod 56 in the cylinder 54, as shown diagrammatically in FIG. 3, acts to raise the pressure of fluid in the cylinder 54, the conduits 52 and 40, and the tube 16, to a value effective to produce the desired tube expansion. A fluid pressure of approximately 1000 p.s.i. or higher, readily provided with such a hydraulic circuit, may be required to achieve the desired tube expansion.

Any shortening of the tube 16 incident to its expansion tends to shift the tube 16 longitudinally within the assembly of fins 12. Referring to FIG. 4, the tube 16 tends to move to the right which, if such movement carries the end fin 12–N to position spaced from the fixture, will leave the terminal portion of the tube 16 exposed. The high fluid pressure within the tube may tend to cause an undesirable bubble or swell in this terminal portion of the tube. In keeping with the present invention, the plunger 42, which is slidable within the fixture 32, is exposed at its left end 64 to the pressure fluid, which maintains the end of the plunger 42 in contact with the adjacent fin 12–N of the fin assembly and the end of the tube 16 abutted against the stop 32 within the plunger. This action of the plunger confines the assembly of fins between the end of the plunger 32, and the end of the barrel 48 of the venting fixture 30 at the opposite end of the tube. Thus, the terminal portion of the tube 16 adjacent the venting fixture is encased during the expansion process by the barrel 48 thereby preventing this region of the tube from becoming exposed and the possibility of the high fluid pressure within the tube causing excessive enlargement. Similarly, the end of the tube 16 projecting from the fin stack into the plunger 42 is encased thereby, preventing the tube from becoming exposed. The action of the plunger 42 in moving in the direction of the stack maintains the end of the plunger in abutment with the end fin 12–N of the stack, thereby maintaining uniform spacing between fins fixed by the flanges or collars 14 thereof which serve as spacing means.

In connection with the application of the method of this invention, to expand a plurality of tubes into engagement with fins in a stack, to form an assembly, as shown, for example, in FIG. 8, which might be an evaporator or condensor cooling coil portion, a suitable apparatus may be provided with multiple head sealing fixtures for receiving a plurality of tubes. Such a multiple head venting fixture will include a plurality of barrels mounted, for example, in vertical array so that each is movable into sealing engagement with the end of one tube of the assembly. A similar multiple head telescoping fixture for the opposite end of the assembly having a plunger for each tube will provide means for conveying pressure fluid to the tubes and for sealing.

I claim as my invention:

1. In an apparatus for fixing a stack of fins on a tube of expandable material, said fins having a portion defining an opening slightly larger than the tube, means between said fins for spacing said fins in said stack, the combination comprising, a frame, an elongated horizontal trough carried by the frame for supporting a stack of fins with the openings in the fins of said stack in substantial alignment, sealing fixtures mounted at spaced points along said trough for mounting a tube extending through the aligned fin openings and projecting from both ends of the fin stack, each said sealing fixture having a tubular member sealingly receiving the respective tube end, one tubular member being slidably mounted on the respective fixture and having an initial position encasing the adjacent end of the tube and abutting the fin stack, said fin stack being located between said sealing fixtures, a connection through one of said sealing fixtures to the inside of the tube for conveying pressure fluid to expand the tube into engagement with the portions of the fins surrounding the tube, said slidably mounted tubular member having an area exposed to said pressure fluid tending to move the latter member in the direction toward the stack so as to maintain abutment against the fin stack and said stack confined between said fixtures with the fins thereof separated by said spacing means despite tube shortening while expansion progresses.

2. In an apparatus for fixing a stack of fins on a tube of expandable material, said fins each having a portion defining an opening slightly larger than the tube, and elements spacing adjacent fins in said stack, the combination comprising, a frame, an elongated horizontal trough carried by the frame for supporting a stack of fins with the openings in the fins of said stack in substantial alignment, sealing fixtures mounted at spaced points along said trough for mounting a tube extending through the aligned fin openings and projecting from both ends of the fin stack, each said sealing fixture having a member cooperating with the respective tube end to seal the latter, one of said members being slidably mounted both on the respective fixture and on the tube and having an initial position encasing the adjacent end of the tube and abutting the stack of fins, means abutting the opposite end of the fin stack, a connection for conveying pressure fluid to the inside of the tube to expand the latter into engagement with the portions of the fins surrounding the tube, said slidably mounted member having an area exposed to said pressure fluid tending to move the latter member in the direction toward the stack so as to press the stack against said abutting means and thereby maintain adjacent fins uniformly spaced by said elements despite tube shortening while expansion progresses.

3. The invention according to claim 1 wherein one of said fixtures includes a valve for selectively venting fluid with entrapped air from the tube.

4. The invention according to claim 1 wherein said trough has associated therewith members extending longitudinally of the fin stack on all sides of the fins thereby to maintain a straight tube and fin stack supported thereon.

5. In an apparatus for fixing a stack of fins on a tube of expandable material, said fins having a portion defining an opening slightly larger than the tube, means between said fins for spacing said fins in said stack, the combination comprising, a frame, means for supporting a stack of fins with the openings in the fins of said stack in substantial alignment, means including spaced sealing fixtures for mounting a tube extending through the aligned fin openings and projecting from both ends of the fin stack, each said sealing fixture having a tubular member sealingly receiving the respective tube end, one tubular member being slidably mounted on the respective fixture and having an initial position encasing the adjacent end of the tube and abutting the fin stack, said fin stack being located between said sealing fixtures, a connection through one of said sealing fixtures to the inside of the tube for conveying pressure fluid to expand the tube into engagement with the portions of the fins surrounding the tube, said slidably mounted tubular member having an area exposed to said pressure fluid tending to move the latter member in the direction toward the stack so as to maintain abutment against the fin stack and said stack confined between said fixtures with the fins thereof separated by said spacing means despite tube shortening while expansion progresses.

References Cited by the Examiner

UNITED STATES PATENTS

| | | |
|---|---|---|
| 1,095,477 | 5/1914 | Still. |
| 1,818,592 | 8/1931 | Walworth _____ 29—157.3 |
| 1,818,593 | 8/1931 | Walworth _____ 29—202 |
| 2,481,490 | 9/1949 | Bennett et al. _____ 29—202 |
| 2,941,569 | 6/1960 | Holt et al. _____ 29—202 XR |
| 3,006,066 | 10/1961 | Grossen et al. ____ 29—157.3 XR |
| 3,007,237 | 11/1961 | Woodruff _____ 29—157.3 |

WHITMORE A. WILTZ, *Primary Examiner.*

J. D. HOBART, *Examiner.*